United States Patent [19]

Possell

[11] Patent Number: 5,191,247

[45] Date of Patent: Mar. 2, 1993

[54] SUBSTANTIALLY NOISELESS FAN FOR INTERNALLY COOLING ELECTRIC MOTORS

[76] Inventor: Clarence R. Possell, 11618 Placid Ct., Colton, Calif. 92324

[21] Appl. No.: 763,256

[22] Filed: Sep. 20, 1991

[51] Int. Cl.$^5$ .............. H02K 9/06; H02K 5/24; F01D 1/36; F03B 5/00

[52] U.S. Cl. .............................. 310/62; 310/51; 415/90

[58] Field of Search .............. 310/62, 63, 60 R, 58, 310/51; 415/90; 416/223 B

[56] References Cited

U.S. PATENT DOCUMENTS

| | | | |
|---|---|---|---|
| 983,037 | 1/1911 | Feld | 415/90 |
| 1,996,460 | 4/1935 | Coates | 310/62 |
| 2,087,834 | 7/1937 | Brown et al. | 415/90 |
| 2,632,598 | 3/1953 | Wales, Jr. | 415/90 |
| 4,036,584 | 7/1977 | Glass | 415/90 |
| 4,406,959 | 9/1983 | Harano et al. | 310/58 |

OTHER PUBLICATIONS

Roddy et al., Performance Characteristics of a Multiple-Disk Centrifugal Pump, Mar., 1987.

*Primary Examiner*—Steven L. Stephan
*Assistant Examiner*—C. LaBalle
*Attorney, Agent, or Firm*—John H. Crowe

[57] ABSTRACT

A cooling fan positioned within the casing of an electric motor comprising a plurality of closely spaced frustoconical disks carried by the motor shaft which draw intake air past the motor rotor and stator when they are rotated. Bodies of air between the rotating disks are then thrown radially outward by centrifugal force and directed to exhaust vents formed in the casing.

4 Claims, 1 Drawing Sheet

5,191,247

SUBSTANTIALLY NOISELESS FAN FOR INTERNALLY COOLING ELECTRIC MOTORS

BACKGROUND OF THE INVENTION

This invention relates to means for cooling the internal parts of electric motors and has particular reference to a substantially noiseless fan for internally cooling a high speed electric motor, such as used for driving small hand-held tools and the like.

Heretofore, fans for the internal cooling of high speed electric motors have generally comprised a rotating fan member carried by the motor shaft and having a plurality of radially extending fan blades which cause a flow of cooling air over the rotor and stator elements of the motor. The fan blades exert a shoving action against the air and at high speeds they tend to agitate or churn the air resulting in turbulence which causes an undesirable noise and reduces the air moving efficiency of the fan.

SUMMARY OF THE INVENTION

According to the present invention, a cooling fan is provided which is incorporated within the casing of an electric motor and comprises a group of frusto-conically shaped disks spaced small, equal distances apart, mounted on and spaced slightly from a somewhat similarly shaped frusto-conical supporting plate carried by the motor shaft within the motor casing. The disks have central openings therethrough which increase gradually in size as they recede from the supporting plate, and a second plate having a central opening aligned with the openings in the disks is supported outboard of the disk farthest removed from said supporting plate and has a cylindrical flange extending around and spaced from the peripheries of the disks.

When the fan is in operation, a body of air between each pair of disks, and between the supporting and second plates and adjacent ones of the disks, is rotated by virtue of boundary layers of the air adhering to the sides of the disks and inward facing sides of the plates, and the major portion of the body is sheared from the boundary layers due to centrifugal force and moves radially outward toward the outer peripheries of the disks. The air then flows past the peripheries of the disks and is deflected by the cylindrical flange of the second plate to pass through vent passages in the motor casing.

Incoming air is drawn through other passages in the motor casing past the rotor and stator elements of the motor from whence it is drawn through the central openings of the second plate and the disks to displace the air being thrown outwardly from the disks.

Accordingly, a principal object of the present invention is to provide a substantially noiseless cooling fan for relatively high speed electric motors.

A further object of the invention is to provide such a motor cooling fan which can be incorporated within the casing of a small high speed motor.

Another object of the invention is to provide a high efficiency substantially noiseless motor cooling fan which is compact and inexpensive to manufacture.

BRIEF DESCRIPTION OF THE DRAWING

The manner in which the above and other objects of the invention are accomplished will be readily understood from the following specification considered in conjunction with the accompanying drawing, wherein.

DESCRIPTION OF THE PREFERRED EMBODIMENT

Figure 1:
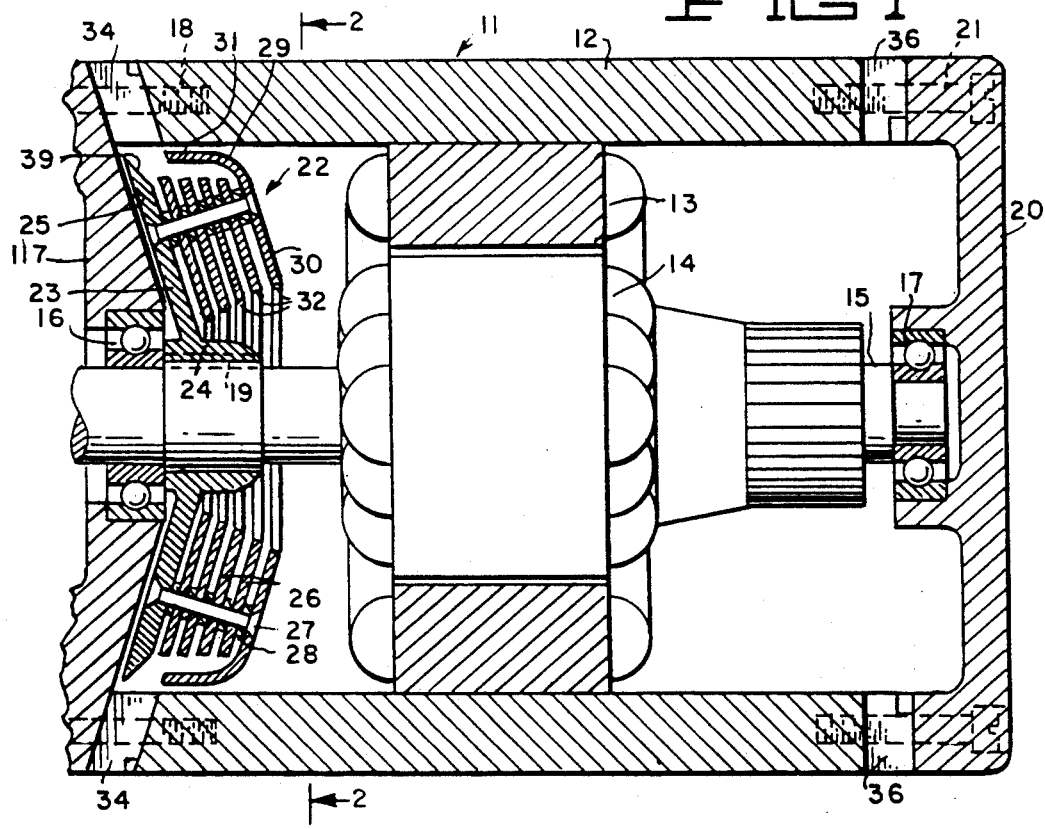
FIG. 1 is a view, mostly in section, of a high speed electric motor embodying a preferred form of the present invention.
Figure 2:
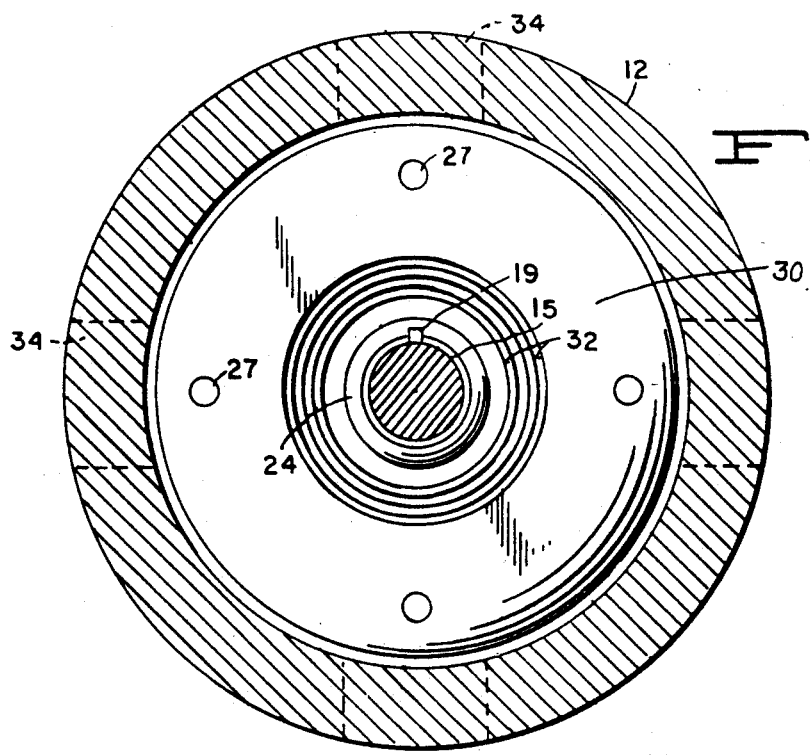
FIG. 2 is a transverse sectional view of the motor taken along line 2—2 of FIG. 1.

Referring now to the drawing, a motor generally indicated at 11 is disclosed which is basically of conventional construction comprising a cylindrical casing 12 within which is a suitable secured annular stator element 13. A rotor 14 which coacts with the stator 13 is mounted on a motor shaft 15 rotatably supported by ball bearings 16 and 17.

The bearing 16 is mounted in a body 117 adapted to house a suitable tool or the like, not shown. The body 117 is secured against one end of the motor casing 12 by bolts, partly shown at 18. The bearing 17 is mounted in an end cap or bell 20 secured to the opposite end of motor casing 12 by screws 21 to form a part of the casing.

According to the invention, a substantially noiseless fan generally indicated at 22 is provided between the body 117 and rotor 14 of the motor assembly. The fan comprises a frusto-conical disk or plate 23 having a hub 24 fastened to motor shaft 15 by a key 19. The plate 23 is located closely adjacent a frusto-conical surface 25 on the body 117.

A group of thin frusto-conical disks 26 with round central openings 32 are supported by the plate 23 concentrically of the shaft 5 by means of standoff rivets 27. Annular spacers 28 are mounted on the rivets 27 to hold the disks 26 in spaced apart relationship. The disks are preferably spaced about 0.045 of an inch apart.

A frusto-conical end disk or plate 30 with another round central opening 32 is supported in spaced relation to the disks 26 by the rivets 27 and spacers 28 and has a cylindrical skirt or flange 31 integral therewith and encircling the peripheries of the disks 26 in spaced apart relationship therewith. A curved shoulder section 29 interconnects the plate 30 and flange 31.

It will be noted that the outer peripheries of the disks 26 are of the same diameter although somewhat smaller than the diameter of plate 23. Also, the central openings 32 in the disks 26 and end plate 30 gradually increase in diameter progressively away from the plate 23. The outer portion of the plate 23 is bevelled at 39 and its outer diameter is substantially the same as the outer diameter of the skirt 31.

When the motor is in operation, the rotor 14 and shaft 15 rotate the group of disks 26 at a relatively high speed and bodies of air in the spaces 33 between each pair of disks and between the plates 23 and 30 and adjacent ones of the disks is rotated due to boundary layers of air adhering to the sides of the disks and inwardly facing sides of the plates. Due to centrifugal force, however, most of the air is sheared from the boundary layers and moves radially outward.

Finally, the air is expelled outwardly from the spaces between the disks and plates 23 and 30 and deflected to the left, as seen in FIG. 1, by the circular skirt 31 on plate 30. The accumulated mass of air then passes outward between the plate 23 and skirt 31 and through vent passages 34 formed in the motor casing 12 adjacent to the body 117. The passages 34 are aligned with the space between the plate 23 and the edge 35 of the cylindrical skirt 31, and are inclined outwardly and to the left, again as seen in FIG. 1, to facilitate venting of the exhaust air.

Intake air is admitted through passages 36 formed in the motor casing 12 adjacent end cap 20 at the end of the motor assembly opposite the end occupied by fan 22. The intake air flows between the stator 13 and rotor 14 and is drawn into the central openings 32 in the plate 30 and disks 26 to replace the air being expelled from the spaces 33 between the disks and plates 23 and 30.

A better understanding of the outstanding feature of my novel fan, its capability of operating in virtually noiseless fashion, will be better understood from a comprehension of the manner in which a conventional bladed fan operates. When such a fan is in operation, much noise is created by air oscillation at the discharge side of the fan as a result of frequencies in the moving air caused by the fan blades passing the discharge opening. This can be likened to the noise created by the propeller of a small aircraft during its takeoff because both fan blades and aircraft propellers have lifting surfaces to move the surrounding air as they rotate. By contrast, my novel fan has no blades with lifting surfaces, the air it moves being accelerated outwardly purely by boundary layer drag on disk surfaces in an orderly and very smooth way so that it never gets set into oscillation. The result is an extremely quiet movement of the air.

All conventional types of devices that move or pump air exhibit lifting surface characteristics resulting in a great deal of operating noise as opposed to my novel fan which moves the air in a primarily laminar flow mode with virtually no accompanying noise. Furthermore, the latter moves the air in a substantially higher discharge flow rate than a conventional lifting surface fan does, as I have determined by actual measurements of comparative flow rates between the two types of fan. I have determined, by such flow rate measurements, that my novel fan design has resulted in a significant increase in discharge velocity while its noise level has gone down up to 100%, or more, on a logarithmic noise basis, by comparison with its conventional counterpart.

My novel fan is effective to move air at any motor speed because its boundary layer drag occurs at all velocities. Consequently, even when its motor is just beginning to turn, the fan starts pumping air. The rate of air output of course increases as the rpm of the fan motor goes up.

The following description of the construction and testing of a 40-hp motor incorporating the novel features of my fan, which I was asked to do by a fan manufacturer, illustrates the outstanding improvement of my novel fan over the conventional bladed fan. In constructing my prototype for this test, I substituted my disk system for a 4-bladed fan in a production model marketed by the aforesaid manufacturer. My novel disk mechanism was mounted in place of and on the same shaft as the fan unit in the production model to yield my prototype, and the motor was turned at the same rpm for comparative runs of the production model with its conventional fan system and my modified version thereof. The bladed procuction model was tremendously noisy because of the blade lifting surfaces going past its discharge opening many times a second to create a noise level with that frequency. This comparative test procedure resulted in a 100% reduction in decibels of my prototype by comparison with the commercial fan with the four blades. The comparison also showed that with my novel prototype there was a substantial reduction in the amount of power necessary to drive the fan and a substantial increase in the amount of cooling air discharged therefrom, compared to the power consumption and discharge air flow from the production model of the fan. This improved performance on the part of my prototype resulted in a very significant reduction in the heating of the operating fan motor.

As those skilled in the art will appreciate, excessive heat is the enemy of an electric motor or generator and the cooling effect of my air moving disks on their driving motor constitutes an important improvement of my novel fan over a conventional fan system with its fan blade lifting surfaces. The lower the generated heat in a fan motor, the less damage to insulation, etc., results when the fan is in operation. This diminished heat generating feature of my novel fan serves to increase its motor cooling effectiveness for purposes of the present invention.

The 40-hp motor employed for the above-described test was a fairly large, heavy motor and one of the noisiest motors that the aforesaid manufacturer produced, which was why it was picked for the test comparison just described.

I claim:

1. In an electric motor assembly including a casing housing a stator and a rotor, a drive shaft interconnected with said rotor to be driven thereby and bearing means rotatably supporting said drive shaft, substantially noiseless cooling means comprising;

a first disk fitted around said drive shaft in said casing for concentric rotation therewith;

a second disk within said casing having a central opening therethrough;

a plurality of other disks, each having a central opening therethrough;

the first, second and plurality of other disks being each of frusto-conical shape and the central openings in the second disk and the plurality of other disks being of progressively larger size in the direction from said first disk towards said rotor;

supporting means supporting said second disk in spaced, parallel relationship with said first disk and between it and said rotor in said casing and the plurality of other disks in spaced parallel relationship with said first and said second disk;

air intake opening means in said casing, said air intake opening means being spaced outwardly from one end of said rotor and the first disk, second disk and plurality of other disks being spaced from the other end thereof; and air exhaust opening means in said casing;

the spacing between the disks being such that when said disks are rotated at a suitable speed bodies of air in the spaces therebetween are rotated due to boundary layers of air adhering to the disk surfaces and portions of said bodies are sheared from said boundary layers and moved radially outward by centrifugal force thereon created by the rotating disks;

the frusto-conical disk closest to said rotor having a substantially cylindrical skirt encircling the peripheries of at least some of the other disks and spaced outwardly therefrom for directing air expelled outwardly from between said disks toward said air exhaust opening means;

said first disk being positioned farther from said rotor than any other disk and having a peripheral extension beyond the periphery of said any other disk; and said air exhaust opening means being positioned to receive the air urged radially outward by the disks and exhaust it from said casing.

2. Substantially noiseless cooling means in accordance with claim 1 in which said peripheral extension is bevelled and defines with the rim of said skirt an annular space through which expelled air from between the rotating disks is directed.

3. Substantially noiseless cooling means in accordance with claim 2 in which said exhaust opening means and said annular space are aligned for ease of air exhaust from said casing.

4. Substantially noiseless cooling means in accordance with claim 3 in which the central openings in the second disk and the plurality of disks are all of round shape.

* * * * *